Aug. 22, 1950  W. H. WANNAMAKER, JR  2,519,615
ANALYZING APPARATUS

Original Filed March 27, 1945   3 Sheets-Sheet 1

INVENTOR.
WILLIAM H. WANNAMAKER JR.
BY
Arthur H. Swanson
ATTORNEY.

Aug. 22, 1950 W. H. WANNAMAKER, JR 2,519,615
ANALYZING APPARATUS
Original Filed March 27, 1945 3 Sheets-Sheet 2

INVENTOR.
WILLIAM H. WANNAMAKER JR
BY
*Arthur H. Swanson*
ATTORNEY.

Patented Aug. 22, 1950

2,519,615

UNITED STATES PATENT OFFICE 2,519,615

ANALYZING APPARATUS

William H. Wannamaker, Jr., Flourtown, Pa., assignor, by mesne assignments, to Minneapolis-Honeywell Regulator Company, Minneapolis, Minn., a corporation of Delaware Original application March 27, 1945, Serial No. 585,125. Divided and this application August 19, 1947, Serial No. 769,555

11 Claims. (Cl. 235—61)

The present invention relates to apparatus for analyzing and studying automatic regulation and control procedures, and, more especially, pertains to apparatus for artificially creating or duplicating characteristics of various physical processes in order to facilitate investigation of the effect of said characteristics and/or the effect of inherent qualities of the automatic control apparatus on the automatic regulation or control obtained.

In fundamental investigations of automatic control procedures, a need often arises for process simulation or duplication. Automatic control procedures may be studied in the field on actual control applications, but such investigations are ordinarily very difficult to carry on because the process under investigation is subject to changing conditions over which there is little or no control. Moreover, in actual control applications in the field, the introduction of intentional load changes, disturbances or control point shifts, which it is necessary to make in order to determine the dynamic action of the control system, is generally not permissible. As a consequence, various methods and apparatus have heretofore been proposed for the purpose of facilitating the investigation of automatic control procedures and apparatus.

The apparatus of the present invention offers advantages of versatility which render it especially suitable and desirable for accomplishing such investigations in the laboratory. Specifically, the dynamic action of the control system applied to control or regulate the simulated process may be readily and accurately observed, and any factor, either in the simulated process or in the automatic controller, may be easily simulated and altered.

An object of the invention is to provide improved apparatus for artificially creating or duplicating characteristics of physical processes. It is a more specific object to attain this result by means of an electrical analogue utilizing electrical resistance and capacitance circuits.

Another object of the invention is to provide in conjunction with indicating type automatic control apparatus improved apparatus for studying the effect on the indicating means, and thereby on the characteristic under investigation, of variations in such factors as throttling range and/or reset rate.

A further object of the invention is to provide improved apparatus for studying the effect on the indicating means, and thereby on the characteristic being investigated, of such changes in a process, or in various different processes, as shifting of the control point, load changes, control agent supply changes, and/or changes in so-called dead time. Dead time may be defined as the elapsed time between the occurrence of a change in a factor operative to ultimately cause a change in the measured characteristic and the time when such change in the measured characteristic actually takes place.

Another specific object of the invention is to provide a simple and efficient electrical circuit arrangement for simulating the flow of a condition controlling agent such, for example, as the supply of heat to a furnace or the supply of liquid to a tank. It is also an object of the invention to provide such an electrical circuit arrangement in which the voltage in any portion of the electrical network through which the current flows represents the magnitude of the condition, such, for example, as temperature or liquid level, being simulated.

A still further specific object of the invention is to provide a simple and efficient electrical circuit arrangement for creating through an impedance load a current flow which is practically independent of the magnitude of said impedance. It is also an object of the invention to provide such an electrical circuit arrangement including readily adjustable means for varying the amplitude of said electrical current and also the range through which said current may be varied.

A still further object of the invention is to provide improved apparatus for investigating the effect on the indicating means, and thereby on the characteristic under investigation, of changes in the controller dead zone, changes in the characteristic of the control valve employed, and also changes in any factor involving any operation of the complete system under investigation. It is a specific object of the invention also to provide a simple and efficient electrical circuit arrangement for artificially simulating characteristics of a control valve and for readily adjusting the size and range of the control valve.

It is a further object of the invention to provide improved apparatus for ascertaining the operating characteristics and relative merits of different types of automatic controllers applied to similar processes.

This application is a division of my prior application, Serial No. 585,125, filed March 27, 1945, which issued as Patent No. 2,453,053 on November 2, 1948, and in which the electrical circuit arrangement for introducing dead time of a pre-determined duration in the transfer of electrical current from one point to another point in an electrical network is claimed.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described a preferred embodiment of the invention.

Figure 1:
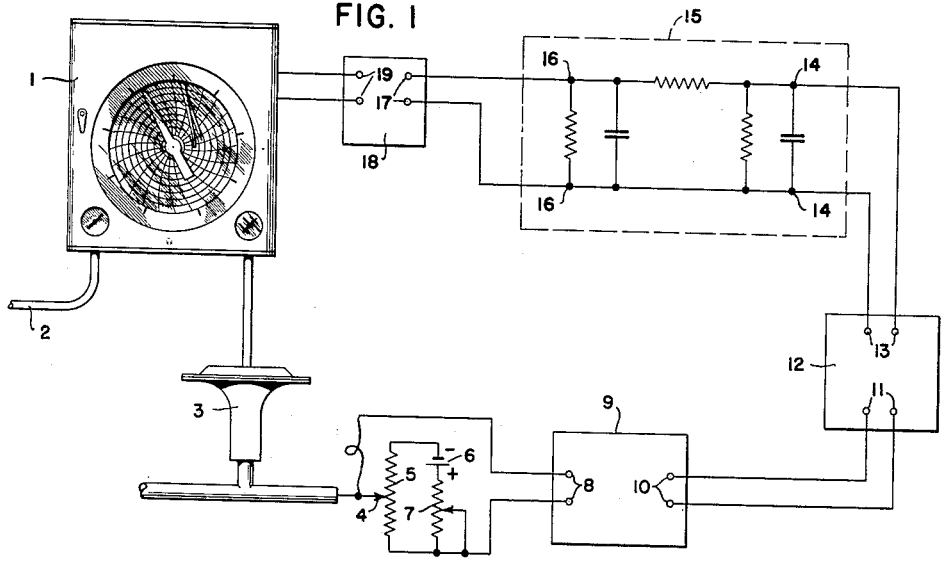
Fig. 1 is a schematic illustration of a preferred form of apparatus according to the present invention.

Prior workers in the art have proposed techniques of applying control to simulated processes. The techniques proposed, however, were limited in their application in that they did not lend themselves readily to adjustment for duplicating a variety of multiple capacity processes. Multiple capacity processes are those possessing two or more capacities each separated from each other by resistance to flow of energy between them. The electrical analogue of the present invention, on the other hand, possesses extreme flexibility for duplicating or simulating numerous processes merely by altering the values of resistances and condensers, which alterations may be easily accomplished in practice, as by means of plug and jack connections.

Inasmuch as a direct relationship has been found to exist between electrical units and thermal and hydraulic units, the physical constants of the resistances and condensers utilized may be calculated using well known theory. The relationship between electrical, thermal and hydraulic units is illustrated by means of the following table. In the table the units are based on point values in order to avoid the complexity of power functions. The time basis of the analogy may bear any chosen convenient ratio to that of the actual process although an altered time relation may introduce complications when the control system involves integral and derivative functions.

Most industrial controllers are provided with some form of pneumatic unit, electrical contact means, or power-set slider on a resistance slidewire for accomplishing the desired control actions on the process to which the controller is applied. The apparatus of the present invention is readily adaptable for use with any one of such industrial controllers, but for purposes of illustration I have shown in Fig. 1 the controller as comprising a self balancing potentiometer 1 equipped with pneumatic control means supplied with air from a suitable source through a pipe 2 for causing the air pressure to a diaphragm valve motor 3 to position a sliding contact 4 along a slidewire resistance 5. The potentiometer 1 and the pneumatic control means including the diaphragm motor 3 may be of the type commercially manufactured and sold by The Brown Instrument Company and respectively disclosed in the Wills application Serial Number 421,173, filed December 1, 1941, now Patent No. 2,423,540 of July 8, 1947, and in the Moore Patent 2,125,081, granted July 26, 1938.

A battery 6 and an adjustable resistance 7 are connected across the slidewire resistance 5 for producing a voltage drop of known magnitude across the latter. A portion of this voltage drop is tapped off the slidewire 5 by the sliding contact 4 for deriving a voltage of variable magnitude which is impressed on the terminals 8 of a unit 9 which I have for convenience termed a dead time unit. The output terminals 10 of the dead time unit 9 are connected to the input terminals 11 of a unit 12, conveniently termed a current input unit, having output terminals 13 which are connected to the input terminals 14 of a unit designed to simulate the capacity and transfer lags of a process under investigation and comprising a resistance-capacitance network 15.

The values of resistance and capacitance in the network 15 in the closed circuit control system of Fig. 1 determine the characteristics of the simulated process under control. The various values of the condensers and resistances are so chosen as to introduce a delay in the voltage transfer through the network from the input terminals 14 to the output terminals 16 corresponding to the delay (resulting from the capacity and transfer lags of the process) occurring between the time a change in the supply of a controlling agent to an actual process under control is made and the time when the process has attained a stabilized condition with the new supply of controlling agent.

The output terminals 16 of the network 15 are connected to the input terminals 17 of an electronic voltmeter 18 having output terminals 19 which are connected to the input terminals of the potentiometer controller 1.

Figure 2:
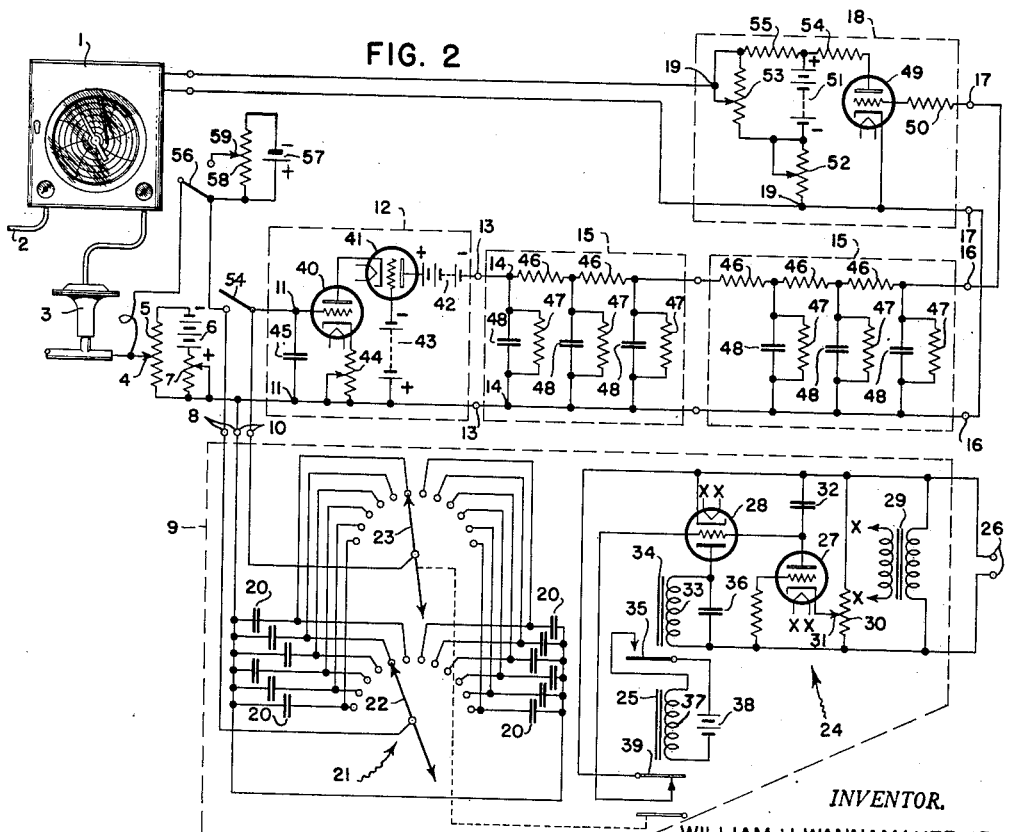
Fig. 2 shows in more or less diagrammatic manner the details of the various units shown schematically in Fig. 1.

As may be seen by reference to Fig. 2, which illustrates in more detail the various units of

|  | Dimensional Symbol | Electrical | Hydraulic | Thermal |
|---|---|---|---|---|
| Quantity 25 | W | coulomb | cu. ft. | B. t. u. |
| Potential | P | volt | ft. | degree |
| Time | T | second | minute | minute |
| Flow | W/T | $\frac{coul.}{sec.}$=ampere | $\frac{cu.\ ft}{min.}$ | $\frac{B.\ t.\ u.}{minute}$ |
| Capacity 30 | W/P | $\frac{coul.}{volt}$=farad | $\frac{cu.\ ft.}{ft.}$ | $\frac{B.\ t.\ u.}{deg.}$ |
| Resistance | PT/W | $\frac{volt.}{coul./sec.}$=ohm | $\frac{ft.}{cu.\ ft./min}$ | B. t. u./min. | the arrangement of Fig. 1, the dead time unit 9 includes a number of condensers 20, which preferably are high grade condensers, and a ratchet type multiple contact switch indicated generally at 21, and comprising two sections, one provided with a rotatable contact arm 22 and the other provided with a rotatable contact arm 23. While only twelve condensers and twelve contacts have been shown in connection with each section of the multiple contact switch 21, the number of condensers and the number of points on each section of the multiple contact switch may be larger or smaller as desired. A physical embodiment of the arrangement shown actually comprised twenty-five condensers and twenty-five points on each section of the multiple contact switch. The ratchet type multiple contact switch 21 may be of any suitable type and, for example, may be of the well known telephone type.

An electronic pulse circuit, indicated generally at 24, and an associated relay 25 are provided for actuating the multiple contact switch 21 to advance the contact blades 22 and 23, one step at a time, from one point to the next succeeding point.

One input terminal 8 of the dead time unit 9 is connected to a common terminal of each of the condensers 20, and the other input terminal 8 is connected to the rotatable contact arm 22. The other terminal of each of the condensers 20 is connected to an individual one of the points on the contact switch section associated with the rotatable switch arm 22. Consequently, as the arm 22 is advanced, step by step, from one contact point to the next, an electrical charge is applied to each of the condensers 20 in succession from the slidewire resistor 5. The magnitude of the charge applied to the condensers is directly determined by the position of the contact 4 along the length of the slidewire resistance 5.

As shown in Fig. 2, each of the second mentioned terminals of the condensers 20 is also connected to an individual one of the contact points on the contact switch section which is associated with the rotatable contact arm 23. The switch arm 23 is connected to one output terminal 10 of the dead time unit and thereby to one input terminal 11 of the current input unit 12, and the other input terminal 11 of the latter is connected to each of the first mentioned terminals of the condensers 20. The two switch contact arms 22 and 23 are out of step by one position and the wiring is such that each previously charged condenser applies its potential to the input terminals 11 of the current input unit 12 for a period equal to the time between steps. Specifically, the switch arm 23 is shown as being ahead of the switch arm 22 by one step so that the dead time unit 9 effectively produces a dead time equal to eleven times the stepping or pulsing period in the arrangement shown. If desired, the switch arm 22 may be made to move in step with switch arm 23 and the wiring from the condensers 20 to the contact points of the switch 21 arranged so that the switch arm 23 will be electrically ahead of the arm 22 by one step. When a larger number of condensers is utilized, the stepping or pulsing period remaining the same, the dead time is correspondingly larger. For example, when twenty-five condensers are employed, the dead time is equal to twenty-four times the pulsing period. It is noted that the dead time may be increased or decreased in duration by either varying the number of condensers and contact points on the switch sections, while maintaining the pulsing period constant, or by varying the duration of the pulsing period. The latter method is preferred because variation in the dead time is easier of accomplishment by this method.

The adjustable electronic pulse circuit 24 is supplied with energizing current from a source of alternating current of commercial frequency which is adapted to be connected to the terminals 26. The circuit 24 includes two electronic tubes designated by the numerals 27 and 28 which, as shown, are heater type triodes. Energizing current is supplied to the filaments of each of the triodes 27 and 28 from the secondary winding of a transformer 29 having its primary winding connected across the terminals 26. A potentiometer resistance 30, provided with a sliding contact 31, is also connected across the terminals 26, the cathode of the triode 27 being connected to the sliding contact 31. The control grid of the triode 27 is connected through a suitable resistance to the lower terminal of resistance 30, as seen in the drawing. Accordingly, the voltage drop appearing between the contact 31 and the lower terminal of resistance 30 provides suitable bias voltage for the control grid of the triode 27. The magnitude of this bias voltage may be adjusted as desired by sliding the contact 31 along the length of resistance 30. The anode of the triode 27 is connected by a condenser 32 to the upper terminal of the resistance 30. Thus, alternating voltage of commerical frequency is supplied to the anode circuit of the triode 27, whereby the triode 27 is periodically rendered conductive at the frequency of the supply source.

The output circuit of the triode 28 is connected to the terminals 26 in such manner that this triode is adapted to be rendered conductive during half cycles which alternate with those during which the triode 27 is adapted to be rendered conductive. The output circuit of triode 28 includes the operating coil 33 of a relay 34 which is adapted to close a switch 35 when the relay is energized. The switch 35 is opened when the relay is deenergized, being biased by gravity or other suitable means to its open position. A condenser 36 is connected in shunt to the operating coil 33 for smoothing out the current flow through the latter and, thereby, for eliminating relay chatter. The input circuit of the triode 28 is controlled in accordance with the voltage produced across the condenser 32 which is included in the output circuit of the triode 27.

When the operation of the apparatus is initiated, the potential drop across the condenser 32 is zero, and consequently, the control grid of the triode 28 is then at the same potential as its associated cathode. The triode 28 is then fully conductive and energizes the relay 34 to close the switch 35. This action serves to close an energizing circuit to the operating coil 37 of the relay 25 from a battery 38. As a result, the relay 25 then advances the contact arms 22 and 23 of the switching mechanism 21 to the next position.

As the triode 27 is periodically rendered conductive during alternate half cycles of the commercial alternating current supply source, a charge is gradually built up on the condenser 32 in the direction to render the control grid of the triode 28 negative in potential with respect to the potential of its associated cathode. This action continues until the conduction of the triode 28 is reduced to such an extent that the relay 34 is deenergized. Upon such occurrence, the switch 35 is actuated to its open position whereupon relay 25 is deenergized. Relay 25, as shown, is also provided with a switch 39 which, when closed, short circuits the terminals of the condenser 32 and consequently discharges the latter. Switch 39 is actuated by gravity or other suitable means to its closed position when relay 25 is deenergized and is moved into its open position when relay 25 is energized. Accordingly, when triode 28 is rendered non-conductive due to the charge stored by condenser 32, the deenergizing action of relay 25 operates to permit switch 39 to close and thereby short-circuit condenser 32. This discharges condenser 32, and hence, permits triode 28 to again conduct and energize relay 34. Such energization of relay 34 operates to cause energization of relay 25, which in turn advances the rotatable switch arms 22 and 23 to their next position.

As those skilled in the art will understand, the duration of the periods during which triode 28 is sufficiently conductive to energize relay 34 may be readily controlled by adjustment of the sliding contact 31 along the length of the resistance 30. For example, by increasing the negative bias applied to the control grid of the triode 27, the time required to charge condenser 32 sufficiently negative to render the triode 28 non-conductive is correspondingly increased, and vice versa.

In accordance with the present invention, the sliding contact 31 is adjusted to a position along the length of the resistance 30 corresponding to the magnitude of the dead time it is desired to introduce into the simulated process. In this manner, a readily adjustable means is provided for varying the time interval between the application of a change in the voltage applied to the input terminals of the dead time unit and the time when that voltage change appears between the output terminals of the dead time unit. This delay in the appearance of the voltage change between the input and output terminals of the dead time unit corresponds to the delay occurring in actual complete control systems between the time of application of a change at some point in the system, which is operative to influence a factor of the process under control, and the time when such change has reacted through the complete system to cause a change in the opposite sense at the point where the original change was initiated.

The current input unit 12 is employed to provide a source of current in its output circuit which is regulated in value by adjustment of the voltage applied to its input terminals 11 and the range of values of which may also be varied as desired. A characteristic of the current input unit is that it may be utilized to simulate a mechanical valve, for example, regulating the flow of fuel to a furnace, the valve opening being adjusted in accordance with the voltage impressed on the input terminals 11. Means to be described are also included in the current input unit for varying the size of the simulated valve.

Specifically, the current input unit 12 is provided with two heater type triodes respectively indicated by the reference numerals 40 and 41, a battery 42 for supplying anode or output current to both triodes in series, a battery 43 for supplying suitable bias voltage to the input circuit of the triode 41, and an adjustable resistance 44 for supplying suitable bias voltage to the input circuit of the triode 40. It will be understood that suitable regulated voltage supplies energized from a commercial alternating current source may be employed, instead of batteries 42 and 43, if desired. A condenser 45, which preferably is of small value, is connected across the input terminals 11 for smoothing out the voltage pulsations applied to the input terminals of the current input unit 12 from the output terminals of the dead time unit 9 and to stabilize the potential of the control grid of triode 40 during the switching intervals.

The operation of the current input unit 12 in maintaining a substantially constant flow of current in its output circuit, notwithstanding changes in the voltages in the battery 42 and changes in the magnitude of the load impedance between the terminals 13 (offered by the network 15), may be mathematically explained in the following manner.

Tracing through the complete circuit having connected therein the impedance network 15 and the anode-cathode circuits of the triodes 40 and 41, Equation 1 may be obtained by application of Kirchhoff's principle that the sum of the voltage drops in a closed circuit must be equal to zero.

$$I_p(R_{15}+R_{44}) - u_{40}(E_{11}+I_pR_{44}) + I_pR_{40} - u_{41}$$
$$[E_{43}+I_pR_{44}+I_pR_{40}-u_{40}(E_{11}+I_pR_{44})]+I_pR_{41}-k=0$$
(1)

where $R_{15}$ is the load resistance presented by the impedance network 15 between the output terminals 13 of the current input unit 12; $I_p$ is the output current flow from the current input unit 12 through the impedance network 15; $R_{44}$ is the resistance of the cathode bias resistor 44; $u_{40}$ and $u_{41}$ are the amplification factors of the triodes 40 and 41, respectively; $R_{40}$ and $R_{41}$ are the anode to cathode resistances of tubes 40 and 41, respectively; $E_{11}$ is the signal voltage impressed across the input terminals 11 of the current input unit 12 from the slidewire resistance 5; $E_{43}$ is the voltage of battery 43; and $k$ is a constant.

Differentiating Equation 1 with respect to $R_{15}$, Equations 2 and 3 are obtained:

$$I_p + \frac{\delta I_p}{\delta R_{15}}(R_{15}+R_{44}-u_{40}R_{44}+R_{40}-$$
$$u_{41}R_{44}-u_{41}R_{40}+u_{40}u_{41}R_{44}+R_{41})=0$$
(2)

$$\frac{\delta I_p}{\delta R_{15}} = -\frac{I_p}{R_{15}+R_{44}-u_{40}R_{44}+R_{40}-u_{41}R_{44}-u_{41}R_{40}+u_{40}u_{41}R_{44}+R_{41}}$$
(3)

Equation 4 is obtained by transposing and by substituting P for $$\frac{R_{44}+R_{40}+R_{41}}{R_{15}}$$

in Equation 3.

$$\frac{\delta I_p}{I_p} = -\frac{\delta R_{15}}{R_{15}} \left( \frac{1}{1+P+\frac{R_{44}}{R_{15}}(u_{40}u_{41}-u_{40}-u_{41})-u_{41}\frac{R_{40}}{R_{15}}} \right)$$
(4)

As those skilled in the art will understand, the quantity $$\frac{\delta I_p}{I_p}$$

represents the ratio of the current change in the output circuit of the current input unit 12 for a given change in impedance between the output terminals 13. By inspection of Equation 4 it may be observed that the current $I_p$ flowing in the output circuit of the current input unit 12 is substantially independent of the magnitude of the load impedance $R_{15}$ over a range extending from zero up to one megohm and higher values of resistance.

Merely by way of illustration, and not limitation, it is noted that, when triodes 40 and 41 are of the commercially available 7F7 type, the other circuit components of the current input unit 12 may have the following values:

| Part | Value |
| --- | --- |
| 44 | 5,000–150,000 ohms. |
| 42 | 300 volts. |
| 43 | 80 volts. |
| 45 | 0.05 microfarad. |

When these circuit components are employed and resistances $R_{15}$ and $R_{44}$, for example, are assigned values of 500,000 ohms and 100,000 ohms respectively, the value of the quantity $$\frac{1}{1+P+\frac{R_{44}}{R_{15}}(u_{40}u_{41}-u_{40}-u_{41})-u_{41}\frac{R_{40}}{R_{15}}}$$

may be readily calculated and found to be approximately 0.001 when the anode to cathode resistances of each of the triodes 40 and 41 is assumed to be 20,000 ohms and the amplification factor $u$ of each of the triodes is assumed to be 70. Accordingly, the change in output current flow from the current input unit 12 upon change in the magnitude of the load resistance $R_{15}$ will be $$\frac{\delta R_{15}}{R_{15}}(0.001)$$

or, in other words, only 0.1% of the ratio $$\frac{\delta R_{15}}{R_{15}}$$

Thus, if the change in load resistance $R_{15}$ is 250,000 ohms, the change in output current flow from the current input unit 12 with respect to its original value will have the value of $$\frac{250,000}{500,000}(0.001)$$

or 0.05%. Consequently, there is an insignificant change in the flow of current from the output circuit of the current input unit 12 upon change in the value of the load resistance $R_{15}$ over an extended range.

Figure 3:
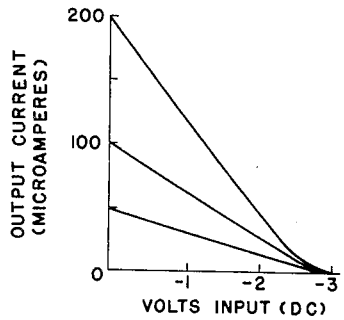
Fig. 3 is a graph showing the output current versus applied input voltage relation of the current input unit of Fig. 2.

Fig. 3 is a graph illustrating curves of anode or output current flow in the output circuits of the triodes 40 and 41 plotted against voltage impressed on the input terminals 11 from the dead time unit 9 for various values of resistance 44. In this graph it is contemplated that the load impedance connected in the output circuit of the triodes 40 and 41 may have any value from zero to at least one megohm and to higher values, if desired.

The output current flow derived from the current input unit 12 is impressed upon the input terminals 14 of the resistance-capacitance network 15 constituting the simulated process. The value of the current flow to the resistance-capacitance network 15 is a function of and is determined by the voltage impressed on the input terminals 11 of the current input unit 12 from the dead time unit 9. The output voltage variations which appear between the output terminals 16 of the resistance-capacitance network 15 simulate the variable being measured for an actual process, such, for example, as the temperature within a furnace. In order to measure the voltage variations between the terminals 16, the vacuum tube voltmeter 18 is employed in conjunction with the potentiometer controller 1. The vacuum tube voltmeter 18 serves as an impedance matching device to permit the proper functioning of the potentiometer controller 1, which controllers ordinarily are designed to work from low voltage, low impedance circuits.

The resistance-capacitance network 15 includes a number of resistances 46 and also a number of parallel connected resistances 47 and condensers 48. The condensers 48 may be of any suitable type and, for example, may be paper type condensers or may be dry electrolytic condensers. In the aforementioned practical working embodiment of the invention, the condensers 48 are wired to colored jacks on a Bakelite panel, and about 30,000 microfarads of capacity are used together with about thirty adjustable resistors 46 and 47. These are adapted to be connected by means of jumpers into jacks to form various types of mesh circuits. A built-in bridge circuit and null indicator (both not shown) are also included for circuit measuring purposes. It is noted that when the condensers 48 are of the electrolytic type, a circuit calling for higher shunt resistances than are inherent in the condensers, in the form of leakage, may not be utilized. In addition, variation of capacity and leakage, both with ambient temperature and impressed voltage, must be taken into account. While electrolytic condensers impose such limitations upon the use of the apparatus, a real advantage is gained in their use, however, in that many industrial process applications may be simulated satisfactorily with considerable saving in cost and space.

The vacuum tube voltmeter 18 comprises a sharp cut-off heater type tube, preferably a pentode but shown for convenience as a triode 49, which is operated at a low plate voltage. A large series grid resistor 50, connected between the control grid of triode 49 and one output terminal 16 of the resistance-capacitance network 15, is utilized to reduce grid current to a low value. Anode current is supplied to the triode 49 from a battery 51 through an adjustable resistance 52 and a fixed resistance 54. The potential drop across an adjustable portion of the load resistance 52 provides the voltage to operate the potentiometer controller 1. In order to make the potentiometer controller read upscale for an increasingly negative voltage applied to the control grid of the triode 49, an adjustable resistance 53 is provided in shunt to the battery 51 in series with a resistance 55 to derive a voltage which may be opposed to the voltage drop across resistance 52. That is to say, the voltage drops across the resistors 52 and 53 are equal, whereby their resultant is zero, when zero voltage is impressed on the control grid of the triode 49 from resistance-capacitance network 15.

Preferably, the anode voltage supply derived from the battery 51 and the source of voltage for energizing the heater filament of triode 49 are regulated. Such regulating means are desirable especially when these voltages are derived from an alternating current source. Desirably, two vacuum tube voltmeters may be provided so that one may be employed to actuate the potentiometer controller, as shown, and the other may be employed to actuate a recorder to show the demand or the actual fuel flowing, or may be utilized to indicate the voltage within any portion of the process mesh circuit 15.

In the aforementioned practical working embodiment of the present invention, an impedance measuring bridge is built into the panel board, with jacks for inserting leads from the various circuit components, and an ordinary electronic amplifier and electron-ray tube of the indicating type are utilized as a null indicator.

In the operation of the arrangement shown in Fig. 2, the diaphragm motor positions the sliding contact 4 along the length of the slidewire resistance 5 in accordance with the variations in the applied air pressure, and thereby, according to the variations in magnitude of the voltage impressed on the input terminals of the potentiometer controller 1. Since the number of valve positions is limited to the number of convolutions provided on the slidewire resistance 5, this number is made suitably high and, for example, may be 200, although more convolutions or fewer convolutions may be employed. A greater number of convolutions than 200 may require the use of a valve positioner. The sensitivity obtained with 200 convolutions has proved satisfactory when used in conjunction with the dead time unit 9 with its step function, as described.

It is noted that in low capacity processes where low rates of switching would be objectionable, dead time to any large degree is generally not met in actual practice and the consequent fast pulsing of the dead time unit 9 provides a satisfactory dead time even for such low capacity processes. The twenty-five position selector switch 21 was chosen in the aforementioned representative embodiment of the invention as the most feasible device to approximate delays of from zero to several minutes duration. As previously explained, its rotation is made in a series of steps, the time between each step being determined by the electronic pulse circuit 24. The condensers 20 used with the switch 21 may stand idle for the necessary periods without appreciable loss of charge, while the current drain during the period each is connected to the current input unit 12 is small.

The reason for utilizing a current input unit 12 of the type disclosed and described will now be explained. As those skilled in the art understand, most processes are non-regenerative. For example, a burning fuel releases a certain number of heat units regardless of the temperature within the fire box. If the supply of fuel is reduced, heat does not flow back into the fuel supply as fuel. It is for the purpose of simulating such a burner that the current input unit 12, consisting of a high gain amplifier having considerable negative feedback, is utilized. With this current input unit 12, a current will flow in the output circuit at a predetermined value practically independent of the impedance into which it is working when a fixed potential is applied to its input terminals 11. When the load into which the current input unit 12 is working is composed of condensers and resistances, as in the mesh analogue circuit 15, this flow of current simulates flow of heat, while the voltage in any portion of the resistance-capacitance mesh represents temperature. If the demand goes to zero, the current input to the terminals 14 of the resistance-capacitance network 15 from the current input unit 12 will be made zero, the current will not flow back into the source, the current input unit 12, to alter the voltage in any portion of the resistance-capacitance mesh, and accordingly, will not alter the simulated rate of heat dissipation. If decrease in demand should occur, the input current will be reduced to some lower value in accordance with the demand. In the arrangement shown, the complete current supply system has been designed to approximate a semi-logarithmic valve characteristic in its action. The characteristic of the valve may be predetermined as desired by suitable design of the slidewire resistance 5, as for example, by winding the resistance on a form having a shape corresponding to the valve characteristic desired.

Figure 5:
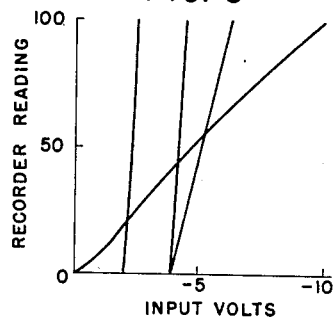
Fig. 5 illustrates calibration curves obtainable with the vacuum tube voltmeter of Figs. 1 and 2.
Figure 4:
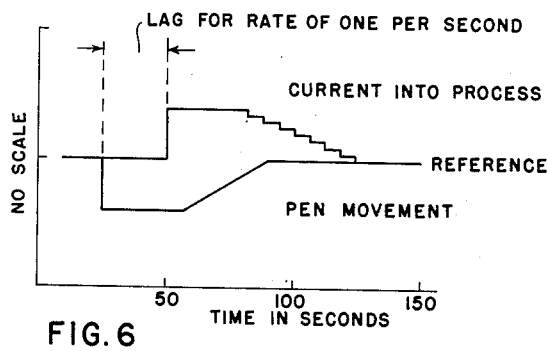
Fig. 4 is a graph illustrating the effect of the dead time unit of Figs. 1 and 2.

Figs. 3, 4 and 5 illustrate, in more or less diagrammatic manner, typical performance characteristics of the apparatus disclosed in Figs. 1 and 2. Fig. 3, previously referred to, illustrates the current flow into the resistance-capacitance network 15 or process analogue for different values of impressed voltage on the input terminals of the current input unit 12. It is noted that the current value is practically independent of the dynamic impedance of the process mesh circuit 15 and that the equivalent valve size may be chosen as desired by changing the self-biasing resistor 44.

Fig. 4 illustrates the manner in which the dead time unit 9 delays the voltage from the valve slidewire, while Fig. 5 illustrates several different calibration curves obtainable with the voltmeter 18 by means of which the equivalent of suppressed range studies, for example, may be made.

Although it is possible, by means of the method and apparatus shown in the drawings and herein described, to approximate a particular process through regulation of its resistance and capacity, it is only necessary in practice to arrange certain combinations of capacity, transfer lag and dead time to represent whatever particular characteristics are desired. In this manner, the effect of various characteristics in automatic control may be investigated by means of the apparatus described without actually attempting to set up specific processes. A principal application for the arrangement disclosed, therefore, is to simulate process characteristics rather than to duplicate a specific physical process, although the latter may also be done if so desired. Examples of types of problems which may be solved in accordance with the present invention are given hereinafter.

Figure 6:
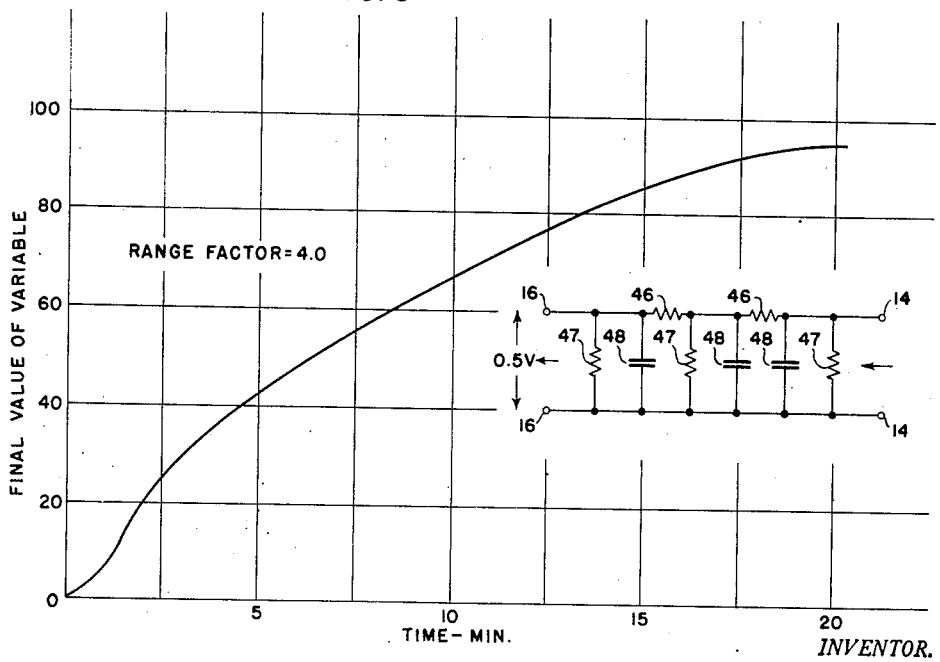
Fig. 6 is a graph showing a reaction curve of a process simulated by means of the arrangement of Figs. 1 and 2.

One typical use to which the invention may be put is the determination of the reaction curve of a process. A reaction curve, an example of which is shown in Fig. 6, shows the dynamic action of the process to a sudden change of control agent input and is obtained by fixing the position of the control valve and allowing the measured variable to line out at a value slightly below the control point. During this period the process is under manual control rather than automatic control.

In obtaining a reaction curve of a process, for example that shown in Fig. 6, a small sudden movement of the valve to a new fixed position is made. If the process under investigation has self-regulation, the measured variable will gradually rise to a new balanced value. If the magnitude of the change has been properly selected, the final value should be slightly above the control point. The resulting change with time of the measured variable is the process reaction curve. It is noted that this reaction curve includes the effect of measuring and controller lags as well as the process characteristics.

Another use to which the invention may be put is the study of the relative merits of suppressed range controllers. Controllers with a suppressed range scale have come increasingly into use for the purposes of more accurate readability and control of the magnitude of the controlled variable. For example, if it is desired to control a temperature of 250° F. it is becoming common practice to use a controller calibrated 150° to 300° F. instead of 0° to 300° F. This suppressed range has an effect on the controller adjustments because of the different rate of controller pen motion for the same rate of temperature change.

In conducting an investigation of the effect of suppressed range controller scales upon optimum controller adjustments, the first step is to select a suitable process which approximates an actual process of the type upon which controllers provided with controller adjustments are employed. Such a controller might, for example, be a proportional reset controller. This type of process generally involves slight transfer lag with moderate process capacity. For the purposes of this investigation, dead time is not required and is, accordingly, omitted. To this end, a switch 54 is provided for directly connecting the sliding contact 4 to the control grid of the triode 40 and for shunting out the dead time unit 9.

A representative process, which may be employed for investigating the effect of a suppressed range controller scale upon controller adjustment, is illustrated in the graph shown in Fig. 6 which represents the reaction curve of a multiple capacity process simulated by means of three resistance-capacitance networks, as shown in Fig. 6. The values of resistance 47 and condenser 48 in each network except the first, namely that connected to the input terminals 14, are respectively 300,000 ohms and 300 microfarads. The values of the resistance 47 and condenser 48 connected across the input terminals 14 are respectively 120,000 ohms and 750 microfarads. In each case the resistance 47 includes the leakage resistance of its associated condenser. Each resistance-capacitance network is connected by a resistance 46 of a value of 40,000 ohms to cause an equivalent temperature drop between the condensers. In order to obtain a fixed rate of decrease in the variable being measured, the condensers are shunted by high value resistances which approximate a loss of heat to atmosphere from each condenser. The resistance across the last condenser is for convenience called the demand. Its value determines the heat flow required from the demand capacity.

The next step in the investigation is to determine the valve size, which is accomplished by setting the range adjuster on the current input unit, namely the resistance 44, so that the full open position of the control valve provides the same rate of rise in the variable being measured as rate of fall when the valve is completely closed. In the instant investigation, the proper valve range was determined to be 0 to 100 microamperes, corresponding to the lowest and highest controller output pressures. The next step is to check the valve size to insure that a 50% to 75% setting of the control valve maintains the variable being measured at the control point. Any adjustments which may be required may be made by varying the magnitude of resistance 44.

A potentiometer pneumatic controller, as shown at 1 in Figs. 1 and 2, may be connected to the process previously described, and adjustments of proportional band (throttling range) and reset rate selected for control of the process. The adjustments are based on minimum area recovery for a supply change. Proportional band is defined as the range of values of the controlled variable which corresponds to the full operating range of the final control element or valve. Reset rate is the number of times per minute that the effect of the proportional action upon the final control element or valve is duplicated by the proportional speed floating action, which, in turn, is defined as a controller action in which there is a continuous linear relation between values of the controlled variable and rate of motion of the final control element.

The supply change may be manually introduced by means of a switch 56, battery 57, slidewire resistance 58 and contact 59 provided in association with the slidewire resistance 5 so that a sudden additional bias voltage is inserted in the sliding contact lead on the control valve slidewire. For example, the supply change may be of such magnitude that when the voltage is introduced, a 25% increase in flow is caused with the actual valve position remaining unchanged. This corresponds to a change in upstream pressure at the control valve, cause a greater flow of control agent, and requires that the controller correct for this change.

Figure 7:
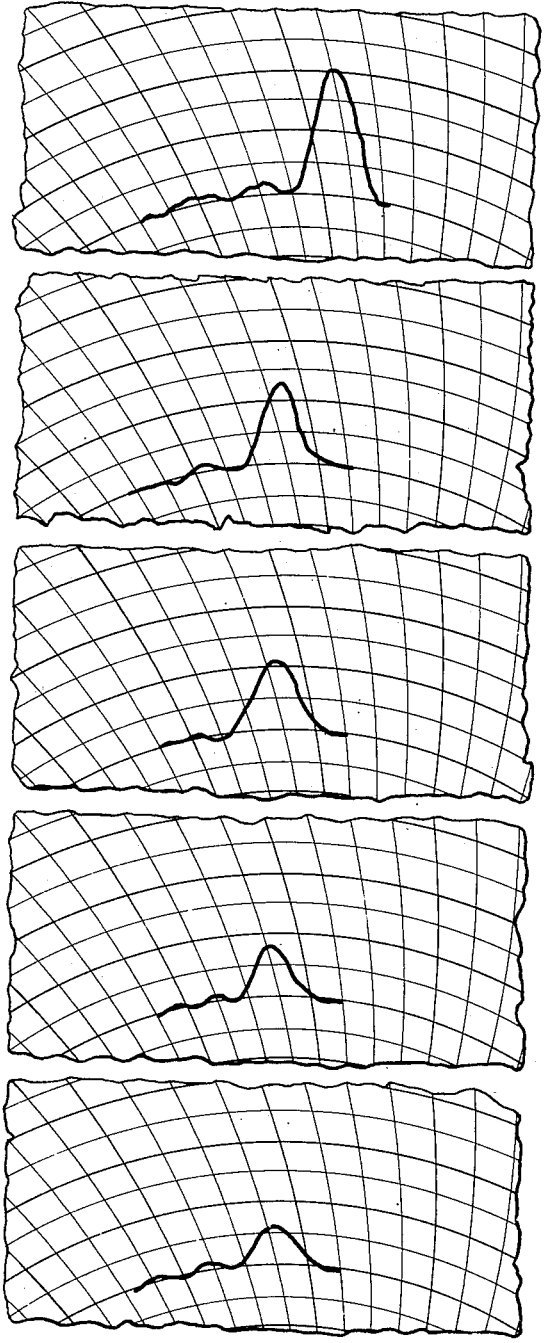
Fig. 7 is a graph showing a number of recovery curves for the process having the reaction curve of Fig. 6.

The potentiometer controller 1 may then be calibrated to various spans and the suppression adjusted so that the control point represents a predetermined value: for example, three volts. The controller adjustments may then be redetermined. The following table shows the results obtained for the example being considered, while in Fig. 7 are shown the typical recovery curves for each condition.

| Controller Calibration, Span-volts | Proportional Band—s, Percent Scale | Reset Rate—r, Per Minute | Max. Deviation, Volts |
|---|---|---|---|
| 6 | 22 | .51 | .40 |
| 5 | 32 | .48 | .42 |
| 4 | 38 | .47 | .42 |
| 3 | 44 | .43 | .42 |
| 2 | 52 | .39 | .42 |

From a theoretical standpoint, it would be expected that the proportional band would follow a reciprocal law such that as the controller span is reduced by one-half, the proportional band would be doubled. The results of these tests are in approximate agreement as may be seen from the above table. The proportional band is smaller than expected, however, at the smaller scale spans having the greatest amount of suppression.

This discrepancy is capable of explanation as follows. If non-linearities exist in the control system, it is possible that the greater deviation in percent of scale, representing the same deviation in voltage for various spans, may require a smaller proportional band in order to achieve the same stability in the recovery curve. Since the controller is calibrated for linear response of voltage input to air pressure output, it is unlikely that this is the cause of the discrepancy.

A second cause may be the difference in apparent dead zone of the control system with respect to changes in voltage of the process when various controller spans are utilized. For example, a dead zone of 0.04% of controller scale with a six volt span would represent 0.0024 volt, while at a two volt span the dead zone would represent 0.0008 volt. Since the process possesses slight transfer lag, the decrease in apparent dead zone with smaller spans would allow a slightly smaller proportional band, thus at least partially accounting for the discrepancy.

The third cause may be that controller adjustments were not set to the optimum values to produce a recovery curve having the smallest possible period. This may further account for the discrepancy. In fact, the recovery curves of Fig. 7 indicate that the period increases slightly as the span is decreased. Controller adjustments were made in each case without changing the reset rate from the previous setting. It was found necessary in every test to decrease the reset rate in order to achieve the desired stability. Although the reset rate should be unchanged with various spans, the required decrease in reset rate may be in part due to the method of selecting controller adjustments.

It is worthwhile to note that in using any type of analogue for investigations in automatic control, it is necessary to avoid imposing any limitations on the operation of the analogue under dynamic conditions. If the control valve is required to move to its limit of travel, if the process reaches a potential beyond which it can not go, or if the controller pen should attain full scale, the complete system is unable to follow adequately its own laws of operation. Such action in the system correspondingly influences the dynamic operation unless limits are required as in two position control.

From the foregoing it is evident that the electrical analogy method and apparatus herein described for simulating processes lend themselves readily to the selection of varying degrees of process characteristics. It has been shown how such factors as process capacity, transfer lag, dead time, valve size, controller scale range, and load changes are set up on the analogue.

Various investigations of automatic control, particularly when actual control equipment is employed, emphasize the necessity of taking into account such factors as measuring lag, controller lag, and dead zones in the measuring and controlling means, as well as in the process. The results of the investigation of controller span described emphasize the fact that these factors can be neglected only in exceptional cases. Empirical methods of analysis of automatic control must generally be tempered by the influence of factors difficult to account for in mathematical methods. These factors which are difficult to account for in mathematical methods may be readily taken into account by means of the apparatus of the present invention.

Subject matter disclosed in this application and not claimed herein is disclosed and is being claimed in the copending application of Donald P. Eckman and William H. Wannamaker, Jr., Serial No. 585,124, filed March 27, 1945, now Patent No. 2,470,434, in my aforementioned Patent No. 2,453,053, and in my applications Serial No. 43,741, now Patent No. 2,488,505, and Serial No. 43,742, both of which were filed on August 11, 1948.

While, in accordance with the provisions of the statutes, I have illustrated and described a preferred embodiment of the present invention, those skilled in the art will understand that changes may be made in the form of the apparatus disclosed without departing from the spirit of my invention as set forth in the appended claims, and that some features of the present invention may sometimes be used to advantage without a corresponding use of other features.

Having now described my invention, what I claim as new and desire to secure by Letters Patent, is as follows:

1. Apparatus for simulating a control system, comprising a voltage responsive device operative to produce an electrical current varying in amplitude in accordance with the magnitude of a control voltage applied thereto, said device being characterized in that the amplitude of said electrical current is substantially constant irrespective of the magnitude, over a wide range, of the load impedance through which said current flows, said device including a pair of electronic valves each having an anode, a cathode, and a control grid, said electrical current flowing in the anode-cathode circuits of said valves in series, means to energize said anode-cathode circuits of said valves to produce said electric current flow, means to provide a bias voltage for the control grid cathode input circuit of one of said valves including an adjustable bias resistance connected in the cathode circuit of said one of said valves, a source of potential, and means to provide a bias voltage for the control grid cathode input circuit of the second of said valves including said source of potential and including in the cathode circuit of the second of said valves the anode-cathode resistance of said one of said valves and said adjustable bias resistance, an impedance connected in series with said energizing means and the anode-cathode circuits of said valves, said impedance exhibiting electrical characteristics analogous to certain characteristics of the control system being simulated, control means connected between said impedance and said voltage responsive device and operative after the lapse of a time period analogous to another characteristic of the control system being simulated to apply at least a portion of the voltage drop produced across said impedance by the flow of said electrical current to control said voltage responsive device, said last mentioned means including a plurality of condensers, means operative to apply to each of said condensers in succession a charge having a magnitude varying in accordance with the magnitude of said portion of the voltage drop produced across said impedance whereby each of said condensers will have produced thereacross a voltage dependent in magnitude upon the magnitude of the corresponding charge applied thereto, and means operative to connect to said voltage responsive device each of said condensers in succession a predetermined time following the application of a charge thereto to apply the voltages across said condensers to control said voltage responsive device, thereby to control the simulated system represented by the characteristics of said impedance, and means connected to said control means and operable to control said voltage responsive device independently of the control effected by said portion of the voltage drop across said impedance, thereby to effect changes in the operating requirements of the simulated control system.

2. Apparatus for simulating a control system, comprising a voltage responsive device having an input circuit and an output circuit and operable to produce an electrical current in said output circuit varying in accordance with the magnitude of a control voltage applied to said input circuit, said device being characterized in that the amplitude of said electrical current is substantially constant irrespective of the magnitude, over a wide range of variation, of the load impedance through which said current flows, an impedance exhibiting electrical characteristics analogous to certain characteristics of the control system being simulated, means to pass said electrical current through said impedance to produce a voltage drop, control means to derive from said voltage drop a control voltage of corresponding magnitude, means connected between said impedance and the input circuit of said voltage responsive device and operative to apply said control voltage to control said voltage responsive device, thereby to control the simulated system represented by the characteristics of said impedance, the last mentioned means including a plurality of condensers having a common terminal, a multiple contact switch having an operating shaft and having two sections each provided with a switch arm secured to said shaft and with an associated plurality of contact points, each of which is connected to an individual one of the other terminals of said condensers, conductor means connected between said control means and said last mentioned means and operative to apply said control voltage between one of said switch arms and said common terminal of said condensers, means connecting the other of said switch arms and said common terminal of said condensers to the input circuit of said voltage responsive device, said switch arms being so arranged on said shaft with respect to each other and the contact points on their associated switch sections that said one switch arm applies said control voltage to each of said condensers before said second switch arm connects each of said condensers to the input circuit of said voltage responsive device, and means to cause said switch arms to successively engage each of the contact points on their associated switch sections, comprising a plurality of electronic valves, each of said valves having an input circuit and an output circuit, connections to a source of power for supplying alternating current to said electronic valves, conductor means for so connecting said electronic valves to the source of power that one of said valves is operative on only one half of each cycle of said alternating current while another of said valves is operative on only the alternate half cycles of said alternating current, adjustable bias means connected in the input circuit of said one valve, a condenser connected in the output circuit of said one valve, the input circuit of said other valve being connected across the last mentioned condenser, a relay having an operating winding connected in the output circuit of said other valve, a movable member actuable from one position to another position and operative, when actuated, to advance each of said switch arms from one contact point on its associated switch section to an adjacent contact point thereon, a second relay controlled by the first mentioned relay and operative to actuate said movable member, and switch means operated in unison with said movable member to shunt said last mentioned condenser in the output circuit of said one valve when said movable member is in one of said positions, and means connected to said control means and operable to control said voltage responsive device independently of the control effected by said voltage drop across said impedance, thereby to effect changes in the operating requirements of the simulated control system.

3. Apparatus for simulating a control system, comprising means to produce an electrical current having a substantially constant amplitude irrespective of the magnitude, over a wide range of variation, of the load impedance through which said current flows, said means including a pair of electronic valves each having an input circuit and having an output circuit through which said current flows, means to supply energizing voltage to the output circuits of said valves in series, self bias means connected in the input circuit of one of said valves, and bias means for the second of said valves including the output circuit of said one of said valves and said self bias means, an impedance connected in series with the output circuits of said valves, said impedance exhibiting electrical characteristics analogous to certain characteristics of the control system being simulated, means connected to said impedance and operative to measure the voltage drop produced across at least a portion of said impedance by the flow of said current, control means connected between the last mentioned means and the first mentioned means and operative to derive from said voltage drop a control voltage of corresponding magnitude, said control means including means connected to said input circuit of said one of said valves, whereby said control voltage controls said current flow to control the simulated system represented by the characteristics of said impedance, and means connected to said control means and operable to control said first mentioned means independently of the control effected by said voltage drop, thereby to effect changes in the operating requirements of the simulated control system.

4. Apparatus for simulating a control system, comprising means to produce an electrical current having a substantially constant amplitude irrespective of the magnitude, over a wide range of variation, of the load impedance through which said current flows, said means including a pair of electronic valves each having an anode, a cathode, and a control grid, said electrical current flowing in the anode-cathode circuits of said valves, means to energize in series the anode-cathode circuits of said valves to produce said electric current flow, means to provide a bias voltage for the control grid cathode input circuit of one of said valves including an adjustable bias resistance connected in the cathode circuit of said one of said valves, a source of potential, and means to provide a bias voltage for the control grid cathode input circuit of the second of said valves including said source of potential and including in the cathode circuit of the second of said valves the anode-cathode resistance of said one of said valves and said adjustable bias resistance, an impedance connected in series with said energizing means and the anode-cathode circuits of each of said valves, said impedance exhibiting electrical characteristics analogous to certain characteristics of the control system being simulated, means connected to said impedance and operative to measure the voltage drop produced across at least a portion of said impedance by the flow of said current, control means connected between the last mentioned means and the first mentioned means and operative to derive from said voltage drop a control voltage of corresponding magnitude, said control means including means connected to said input circuit of said one of said valves, whereby said control voltage controls said current flow to control the simulated system represented by the characteristics of said impedance, and means connected to said control means and operable to control said first mentioned means independently of the control effected by said voltage drop, thereby to effect changes in the operating requirements of the simulated control system.

5. Apparatus for simulating a control system, comprising means operative to produce an electrical current of adjustable amplitude but having a substantially constant amplitude irrespective of the magnitude, over a wide range of variation, of the load impedance through which said current flows, said means including a pair of electronic valves each having an anode, a cathode, and a control grid, said electrical current flowing in the anode-cathode circuits of said valves, means to energize in series the anode-cathode circuits of said valves to produce said electric current flow, means to provide a bias voltage for the control grid cathode input circuit of one of said valves including an adjustable bias resistance connected in the cathode circuit of said one of said valves, a source of potential, and means to provide a bias voltage for the control grid cathode input circuit of the second of said valves including said source of potential and including in the cathode circuit of the second of said valves the anode-cathode resistance of said one of said valves and said adjustable bias resistance, an impedance connected in series with said energizing means and the anode-cathode circuits of said valves whereby said electrical current flows through said impedance, said impedance exhibiting electrical characteristics analogous to certain characteristics of the control system being simulated, control means connected between said impedance and the first mentioned means and responsive to the magnitude of the voltage produced across at least a portion of said impedance by said electrical current flow to apply a potential of corresponding magnitude between the control electrode and cathode of said one valve to thereby vary the amplitude of said electrical current flow, thereby to control the simulated system represented by the characteristics of said impedance, and means connected to said control means and operable to control said first mentioned means independently of the control effected by said voltage produced across said impedance, thereby to effect changes in the operating requirements of the simulated control system.

6. Apparatus for simulating a control system, comprising a voltage responsive device operative to produce an electrical current varying in amplitude in accordance with the magnitude of a control voltage applied thereto, said device being characterized in that the amplitude of said electrical current is substantially constant irrespective of the load impedance through which said current flows, an impedance exhibiting electrical characteristics analogous to certain characteristics of the control system being simulated, means to pass said current through said impedance to produce a voltage drop thereacross, control means connected between said impedance and said voltage responsive device and operative to vary the amplitude of said current, including a plurality of condensers and means operative to apply to each of said condensers in succession a charge having a magnitude varying in accordance with the magnitude of at least a portion of said voltage drop produced across said impedance, whereby each of said condensers will have produced thereacross a voltage dependent in magnitude upon the magnitude of the corresponding charge applied thereto, and operative thereafter to connect to said voltage responsive device each of said condensers in succession to produce a control voltage for controlling said voltage responsive device, thereby to control the simulated system represented by the characteristics of said impedance, and means connected to said control means and operable to control said voltage responsive device independently of the control effected by said portion of the voltage drop across said impedance, thereby to effect changes in the operating requirements of the simulated control system.

7. Apparatus for simulating a control system, comprising a voltage responsive device operative to produce an electrical current varying in amplitude in accordance with the magnitude of a control voltage applied thereto, said device being characterized in that the amplitude of said electrical current is substantially constant irrespective of the load impedance through which said current flows, an impedance exhibiting electrical characteristics analogous to certain characteristics of the control system being simulated, means to pass said current through said impedance to produce a voltage drop thereacross, control means connected between said impedance and said voltage responsive device and operative to vary the amplitude of said current, including a plurality of condensers, switch means to apply to each of said condensers in succession a charge having a magnitude varying in accordance with the magnitude of at least a portion of said voltage drop produced across said impedance, whereby each of said condensers will have produced thereacross a voltage dependent in magnitude upon the magnitude of the corresponding charge applied thereto, means to connect to said voltage responsive device each of said condensers in succession a predetermined time following the application of a charge thereto to derive a control voltage, means to apply said control voltage to control said voltage responsive device, means controlling said switch means to vary the length of said time, thereby to control the simulated system represented by the characteristics of said impedance, and means connected to said control means and operable to control said voltage responsive device independently of the control effected by said portion of the voltage drop across said impedance, thereby to effect changes in the operating requirements of the simulated control system.

8. Apparatus for simulating a control system, comprising a voltage responsive device having an input circuit and an output circuit and operable to produce an electrical current in said output circuit varying in accordance with the magnitude of a control voltage applied to said input circuit, said device being characterized in that the amplitude of said electrical current is substantially constant irrespective of the magnitude, over a wide range of variation, of the load impedance through which said current flows, an impedance exhibiting electrical characteristics analogous to certain characteristics of the control system being simulated, means to pass said electrical current through said impedance to produce a voltage drop, control means connected between said impedance and the input circuit of said voltage responsive device and operative to derive from said voltage drop a control voltage of corresponding magnitude, means to apply said control voltage to control said voltage responsive device, thereby to control the simulated system represented by the characteristics of said impedance, the last mentioned means including a plurality of condensers having a common terminal, a multiple contact switch having an operating shaft and having two sections each provided with a switch arm secured to said shaft and with an associated plurality of contact points, each of which is connected to an individual one of the other terminals of said condensers, conductor means connected between said control means and said last mentioned means and operative to apply said control voltage between one of said switch arms and said common terminal of said condensers, means connecting the other of said switch arms and said common terminal of said condensers to the input circuit of said voltage responsive device, drive means to cause each of said switch arms to successively engage each of the contact points on its associated switch section, said switch arms being so arranged on said shaft with respect to each other and the contact points on their associated switch sections that said one switch arm applies said control voltage to each of said condensers before said second switch arm connects each of said condensers to the input circuit of said voltage responsive device, and means connected to said control means and operable to control said voltage responsive device independently of the control effected by said voltage drop across said impedance, thereby to effect changes in the operating requirements of the simulated control system.

9. Apparatus for simulating a control system, comprising a device operative to produce an electrical current having a substantially constant amplitude irrespective of the load impedance through which said current flows, an impedance exhibiting electrical characteristics analogous to certain characteristics of the control system being simulated, means to pass said current through said impedance to produce a voltage drop across said impedance, means connected to said impedance and operative to measure at least a portion of said voltage drop including a vacuum tube voltmeter and an exhibiting device controlled by said vacuum tube voltmeter, control means connected between the last mentioned means and the first mentioned device and operative to derive from said voltage drop a control voltage of corresponding magnitude and to apply said control voltage to control said current flow, thereby to control the simulated system represented by the characteristics of said impedance, and means connected to said control means and operable to control said first mentioned device independently of the control effected by said voltage drop, thereby to effect changes in the operating requirements of the simulated control system.

10. Apparatus for simulating a control system, comprising a device operative to produce an electrical current having a substantially constant amplitude irrespective of the load impedance through which said current flows, an impedance exhibiting electrical characteristics analogous to certain characteristics of the control system being simulated, means to pass said current through said impedance to produce a voltage drop across said impedance, said voltage drop having a magnitude jointly determined by the amplitude of said current and by the characteristics of said impedance, a measuring instrument having an input circuit, the impedance of which is substantially smaller than the impedance across which said voltage drop is produced, and having an output connection, an impedance matching vacuum tube voltmeter having an input circuit connected to said impedance and controlled in accordance with the magnitude of said voltage drop and having an output circuit connected to the input circuit of said measuring instrument, control means connected between said output connection of said measuring instrument and said device and operative to control the amplitude of said current in accordance with the magnitude of said voltage drop, thereby to control the simulated system represented by the characteristics of said impedance, and means connected to said control means and operable to control the amplitude of said current independently of the control effected by said voltage drop, thereby to effect changes in the operating requirements of the simulated control system.

11. Apparatus for simulating a control system, comprising a device operative to produce an electrical current having a substantially constant amplitude irrespective of the load impedance through which said current flows, an impedance exhibiting electrical characteristics analogous to certain characteristics of the control system being simulated, means to pass said current through said impedance to produce a voltage drop across said impedance, means to measure at least a portion of said voltage drop including an electronic valve having an input circuit, connected to said impedance and to which said voltage drop is applied, and having an output circuit, said output circuit including in series a voltage supply source and an adjustable resistance across which there appears a potential drop, a second adjustable resistance connected to said voltage supply source, whereby there appears across said second adjustable resistance a voltage drop having a magnitude dependent on the adjustment of said second adjustable resistance, and exhibiting voltage responsive device having input terminals, and means to apply the difference of said potential drops across said resistances between the input terminals of said exhibiting device, control means connected between said measuring means and the first mentioned device and operative to derive from said voltage drop a control voltage of corresponding magnitude and to apply said control voltage to control said current flow, thereby to control the simulated system represented by the characteristics of said impedance, and means connected to said control means and operable to control said current flow independently of the control effected by said voltage drop, thereby to effect changes in the operating requirements of the simulated control system.

WILLIAM H. WANNAMAKER, Jr.

REFERENCES CITED

The following references are of record in the file of this patent:

UNITED STATES PATENTS

| Number | Name | Date |
|---|---|---|
| 1,928,812 | Dawson | Oct. 3, 1933 |
| 2,014,102 | Conklin | Sept. 10, 1935 |
| 2,087,667 | Hedin | July 20, 1937 |
| 2,171,614 | Wendt | Sept. 5, 1939 |
| 2,244,369 | Martin | June 3, 1941 |
| 2,256,802 | Feingold | Sept. 25, 1941 |
| 2,316,577 | Ford et al. | Apr. 13, 1943 |

Certificate of Correction

Patent No. 2,519,615                                                       August 22, 1950

WILLIAM H. WANNAMAKER, Jr.

It is hereby certified that error appears in the printed specification of the above numbered patent requiring correction as follows:

Column 17, lines 12 to 14, strike out the words "connected between said impedance and the input circuit of said voltage responsive device and operative" and insert same after "means" in line 10, same column;

and that the said Letters Patent should be read as corrected above, so that the same may conform to the record of the case in the Patent Office.

Signed and sealed this 19th day of June, A. D. 1951.

[SEAL]

THOMAS F. MURPHY,
*Assistant Commissioner of Patents.*